UNITED STATES PATENT OFFICE.

FRITZ HOFMANN AND KONRAD DELBRÜCK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,081,614.     Specification of Letters Patent.     Patented Dec. 16, 1913.

No Drawing.     Application filed April 5, 1912. Serial No. 688,762.

*To all whom it may concern:*

Be it known that we, FRITZ HOFMANN and KONRAD DELBRÜCK, doctors of philosophy, chemists, citizens of the German Empire, residing at Elberfeld, Germany, have invented new and useful Improvements in Caoutchouc Substance and Process of Making Same, of which the following is a specification.

In the *Journal für Praktische Chemie*, vol. 64, p. 109/110, Kondakow described a polymerization product obtained by autopolymerization of beta-gamma-dimethylerythrene. This product is totally different from the caoutchouc substance obtained by heating beta-gamma-dimethylerythrene. It is a white crumbly mass which so quickly changes in the air that it can be rolled into sheets only if it is subjected to this process immediately after its production. The sheets thus obtained however can likewise only be kept for a very short time and quickly resinify in the air so that they are useless for technical purposes. It has now been found that this substance can be converted into a stable and technically very valuable product which can be used as a substitute for caoutchouc or gutta percha, by treating it with basic substances, which treatment can also be carried out during the autopolymerization, the basic substance remaining partly or entirely in the treated material.

In order to illustrate the new process more fully the following examples are given, the parts being by weight:—

Example 1:—100 parts of the white product of polymerization obtained from beta-gamma-dimethylerythrene according to the process described by Kondakow are put into 1000 parts of water containing anilin (2 per cent.) and are therein macerated for 24 hours.

Example 2:—1000 parts of beta-gamma-dimethylerythrene are mixed with 300 parts of the product described in Example 1 and 3.5 parts of dimethylanilin. After 4 weeks the caoutchouc like product is obtained.

Example 3:—100 parts of the white product of polymerization obtained from beta-gamma-dimethylerythrene according to the process described by Kondakow are mixed with 20 parts of dimethyl-ortho-toluidin. In this way a caoutchouc like stable product is obtained.

Instead of anilin also other basic compounds can be used, such as ammonia, dimethylamin, diethylamin, caustic soda, etc.

We claim:—

1. The process for the production of a caoutchouc like substance which comprises treating with an alkaline agent the autopolymerization product of beta-gamma-dimethylerythrene, substantially as described.

2. The process for the production of a caoutchouc-like substance which comprises treating with a nitrogenous base the autopolymerization product of beta-gamma-dimethylerythrene, substantially as described.

3. The process for the production of a caoutchouc-like substance which comprises treating with an amin the autopolymerization product of beta-gamma-dimethylerythrene, substantially as described.

4. The process for the production of a caoutchouc-like substance which comprises treating with an aromatic amin the autopolymerization product of beta-gamma-dimethylerythrene, substantially as described.

5. The process for the production of a caoutchouc-like substance, which comprises treating with anilin the autopolymerization product of beta-gamma-dimethylerythrene, substantially as described.

6. The process for the production of a caoutchouc-like substance which comprises adding beta-gamma-dimethylerythrene and a small amount of an alkaline agent to the product of autopolymerization of beta-gamma-dimethylerythrene, and converting the mixture into a caoutchouc like substance.

7. The process for the production of a caoutchouc-like substance, which comprises adding beta-gamma-dimethylerythrene and a small amount of an amin to the product of autopolymerization of beta-gamma-dimethylerythrene and converting the mixture into a caoutchouc-like substance.

8. The process for the production of a caoutchouc-like substance, which comprises adding beta-gamma-dimethylerythrene and a small amount of an aromatic amin to the product of autopolymerization of beta-gamma-dimethylerythrene and converting the mixture into a caoutchouc-like substance.

9. The process for the production of a caoutchouc-like substance which comprises adding beta-gamma-dimethylerythrene and a small amount of an anilin to the product of autopolymerization of beta-gamma-dimethylerythrene, and converting the mixture into a caoutchouc-like substance.

10. As a new product, a stable caoutchouc-like product comprising an autopolymerization product of beta-gamma-dimethylerythrene insoluble in alcohol and containing a small amount of a basic substance, substantially as described.

11. As a new product, a stable caoutchouc-like product comprising an autopolymerization product of beta-gamma-dimethylerythrene insoluble in alcohol and containing a small amount of a nitrogenous base, substantially as described.

12. As a new product, a stable caoutchouc-like product comprising an autopolymerization product of beta-gamma-dimethylerythrene insoluble in alcohol and containing a small amount of an amin, substantially as described.

13. As a new product, a stable caoutchouc-like product comprising an autopolymerization product of beta-gamma-dimethylerythrene insoluble in alcohol and containing a small amount of an aromatic amin, substantially as described.

14. As a new product, a stable caoutchouc-like product comprising an autopolymerization product of beta-gamma-dimethylerythrene insoluble in alcohol and containing a small amount of anilin, substantially as described.

In testimony whereof we have hereunto set our hands in the presence of two subscribing witnesses.

FRITZ HOFMANN. [L. S.]
KONRAD DELBRÜCK. [L. S.]

Witnesses:
 HELEN NUFER,
 ALBERT NUFER.